US012231525B2

(12) United States Patent
He et al.

(10) Patent No.: US 12,231,525 B2
(45) Date of Patent: Feb. 18, 2025

(54) MESSAGE PROCESSING METHOD AND DEVICE, STORAGE MEDIUM, AND ELECTRONIC DEVICE

(71) Applicant: SUZHOU CENTEC COMMUNICATIONS CO., LTD., Jiangsu (CN)

(72) Inventors: Zhichuan He, Jiangsu (CN); Xiaoqiang Ma, Jiangsu (CN); Haiqing Xu, Jiangsu (CN); Jie Zhou, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 351 days.

(21) Appl. No.: 17/787,344

(22) PCT Filed: Sep. 7, 2020

(86) PCT No.: PCT/CN2020/113800
§ 371 (c)(1),
(2) Date: Jun. 20, 2022

(87) PCT Pub. No.: WO2021/120708
PCT Pub. Date: Jun. 24, 2021

(65) Prior Publication Data
US 2023/0043889 A1 Feb. 9, 2023

(30) Foreign Application Priority Data
Dec. 19, 2019 (CN) .......................... 201911320718.8

(51) Int. Cl.
*H04L 69/22* (2022.01)
*H04L 45/16* (2022.01)

(52) U.S. Cl.
CPC .............. *H04L 69/22* (2013.01); *H04L 45/16* (2013.01)

(58) Field of Classification Search
CPC ......... H04L 69/22; H04L 45/16; H04L 67/63; H04L 12/437; H04L 41/04;
(Continued)

(56) References Cited

U.S. PATENT DOCUMENTS

| 2009/0225652 A1* | 9/2009 | Vasseur ............... H04L 41/0677 370/225 |
| 2011/0063973 A1* | 3/2011 | VenkataRaman ....... H04L 45/22 370/242 |

(Continued)

FOREIGN PATENT DOCUMENTS

| CN | 101447900 A | 6/2009 |
| CN | 101662383 A | 3/2010 |

(Continued)

OTHER PUBLICATIONS

Internet Engineering Task Force (IETF); Request for Comments: 8563; Kartz & D. Ward et al.; Juniper Networks/ Cisco Systems, Category: Standards Track; ISSN: 2070-1721; Apr. 2019 (Year: 2019).*

(Continued)

*Primary Examiner* — Mohammed S Chowdhury
(74) *Attorney, Agent, or Firm* — Samson G. Yu

(57) ABSTRACT

A message processing method and device, a storage medium, and an electronic device are provided. The method includes: receiving a message to be processed by means of a Bidirectional Forwarding Detection (BFD) processing engine of a chip, the BFD processing engine storing head Maintenance End Points (MEP); if a head MEP corresponding to the message to be processed is not found in the BFD processing engine of the chip, judging whether to forward the message to be processed to a processor; and if a judgment result is yes, saving the information of the message in a client MEP in the processor. The problem in the related art that an MEP on a Head side in RFC8562 only (Continued)

transmits but does not receive a BFD message, an MEP on a Tail side only receives but does not transmits a BFD message and thus the requirements cannot be satisfied is resolved.

16 Claims, 5 Drawing Sheets

(58) Field of Classification Search
CPC ............. H04L 41/0604; H04L 41/0631; H04L 2012/5612; H04L 2012/5627; H04L 43/0811; H04L 43/10; H04L 2012/421; H04L 45/507; H04L 41/0654; H04L 41/0663; H04L 45/28; H04L 45/68; H04L 45/22; H04L 63/08; H04L 63/1441; H04L 63/162

See application file for complete search history.

(56) References Cited

U.S. PATENT DOCUMENTS

| | | | |
|---|---|---|---|
| 2014/0022886 A1 | 1/2014 | Sinha | |
| 2015/0124626 A1 | 5/2015 | Sul et al. | |
| 2016/0036694 A1* | 2/2016 | Abdul | H04L 43/10 370/244 |
| 2020/0036570 A1* | 1/2020 | Curtis | H04L 41/04 |

FOREIGN PATENT DOCUMENTS

| | | |
|---|---|---|
| CN | 103916258 A | 7/2014 |
| CN | 104660644 A | 5/2015 |
| CN | 104935581 A | 9/2015 |
| CN | 106130823 A | 11/2016 |
| CN | 111064729 A | 4/2020 |
| EP | 2469760 A1 | 6/2012 |
| WO | 2011031812 A1 | 3/2011 |

OTHER PUBLICATIONS

Internet Engineering Task Force (IETF); Request for Comments: 5880; Category: Standards Track Juniper Networks; D. Katz et al. Juniper Networks; ISSN: 2070-1721 Jun. 2010 (Year: 2010).*
Internet Engineering Task Force (IETF); Request for Comments: 5881; Category: Standards Track; Juniper Networks; D. Katz et al. Juniper Networks; ISSN: 2070-1721 Jun. 2010 (Year: 2010).*
Internet Engineering Task Force (IETF); Request for Comments: 5884; Category: Standards Track; Juniper Networks; R. Aggarwal et al. Juniper Networks; ISSN: 2070-1721 Jun. 2010. (Year: 2010).*
Internet Engineering Task Force (IETF); Request for Comments: 5885; Category: Standards Track; Juniper Networks; T. Nadeau et al. Cisco Systems; ISSN: 2070-1721 Jun. 2010 (Year: 2010).*
Internet Engineering Task Force (IETF); Request for Comments: 8562; Category: Standards Track; Juniper Networks; D. Katz et al. Juniper Networks; ISSN: 2070-1721 Apr. 2019. (Year: 2019).*
D. Katz, et al. "Bidirectional Forwarding Detection(BFD) Multipoint Active Tails"Internet Engineering Task Force (IETF). ISSN: 2070-1721. Apr. 30, 2019. (Apr. 30, 2019). Section 6, 10.

* cited by examiner

MESSAGE PROCESSING METHOD AND DEVICE, STORAGE MEDIUM, AND ELECTRONIC DEVICE

The present disclosure is a national stage filing of PCT Application No. PCT/CN2020/113800 filed on Sep. 7, 2020, which claims priority to Chinese patent application No. 201911320718.8, filed on Dec. 19, 2019, and entitled "message processing method and device, a storage medium, and an electronic device", the contents of which are hereby incorporated by reference in its entirety.

TECHNICAL FIELD

The present disclosure relates to the field of computers, and in particular, to a message processing method and device, a storage medium, and an electronic device.

BACKGROUND

Multipoint BFD is defined in RFC8562 (Bidirectional Forwarding Detection for Multipoint Networks). For a special application in a multipoint or multicast network, it conflicts with traditional Bidirectional Forwarding Detection (BFD), because multipoint transmission is unidirectional in nature. This standard is only for verifying the connectivity of unidirectional connection. Two roles are defined in RFC8562: Head and Tail. A Maintenance End Point (MEP) on a Head side only transmits but does not receive a BFD message, and an MEP on a Tail side only receives but does not transmits a BFD message. The essence of the protocol is only for detecting the unidirectional connectivity of Head to Tail. The BFD message will only be transmitted from Head to Tail. The connectivity of Head to Tail is detected only at Tail, while Head does not need to know Tail, thus resulting in that when Head needs to acquire the connection situation of each Tail in some specific situations, the requirements cannot be satisfied.

Aiming at the above problems in the related art, no effective solution currently exists.

SUMMARY

Embodiments of the present disclosure provide a message processing method and device, a storage medium, and an electronic device, intended to at least solve the problem in the related art that an MEP on a Head side in RFC8562 only transmits but does not receive a BFD message, an MEP on a Tail side only receives but does not transmits a BFD message and thus the requirements cannot be satisfied.

According to one embodiment of the present disclosure, a message processing method is provided, which may include the following steps, a message to be processed is received by means of a BFD processing engine of a chip, wherein the BFD processing engine has stored head MEPs. If the head MEP corresponding to the message to be processed is not found in the BFD processing engine of the chip, it is judged whether to forward the message to be processed to a processor. If it is judged to forward the message to be processed to the processor, the information of the message is saved in a client MEP in the processor.

According to another embodiment of the present disclosure, a message processing device is provided, which may include: a receiving module, configured to receive a message to be processed by means of a BFD processing engine of a chip, where the BFD processing engine has stored head MEPs; a judgment module, configured to judge, if a head MEP corresponding to the message to be processed is not found in the BFD processing engine of the chip, whether to forward the message to be processed to a processor; and a saving module, configured to save, if it is judged to forward the message to be processed to the processor, a information of the message in a client MEP in the processor.

According to yet another embodiment of the present disclosure, a storage medium is also provided. The storage medium may store a computer program therein which, when run, is configured to perform the steps in any one of the above method embodiments.

According to yet another embodiment of the present disclosure, an electronic device is also provided, which may include a memory and a processor. The memory stores a computer program. The processor is configured to run the computer program to perform the steps in any one of the above method embodiments.

By means of the present disclosure, a message to be processed is received by means of a BFD processing engine of a chip. Then, if a head MEP corresponding to the message to be processed is not found in the BFD processing engine of the chip, it is judged whether to forward the message to be processed to a processor. Finally, if it is judged to forward the message to be processed to the processor, a information of the message is saved in a client MEP in the processor. Thus, the head MEP can still only transmit but not receive a message, but a client-type MEP is added in the processor, thereby solving the problem in the related art that an MEP on a Head side in RFC8562 only transmits but does not receive a BFD message, an MEP on a Tail side only receives but does not transmits a BFD message and thus the requirements cannot be satisfied, and improving the flexibility of message processing.

BRIEF DESCRIPTION OF THE DRAWINGS

The accompanying drawings described herein are used to provide a further understanding of the present disclosure, and constitute a part of the present application, and the exemplary embodiments of the present disclosure and the description thereof are used to explain the present disclosure, but do not constitute improper limitations to the present disclosure. In the drawings.

DETAILED DESCRIPTION OF THE EMBODIMENTS

Figure 1:
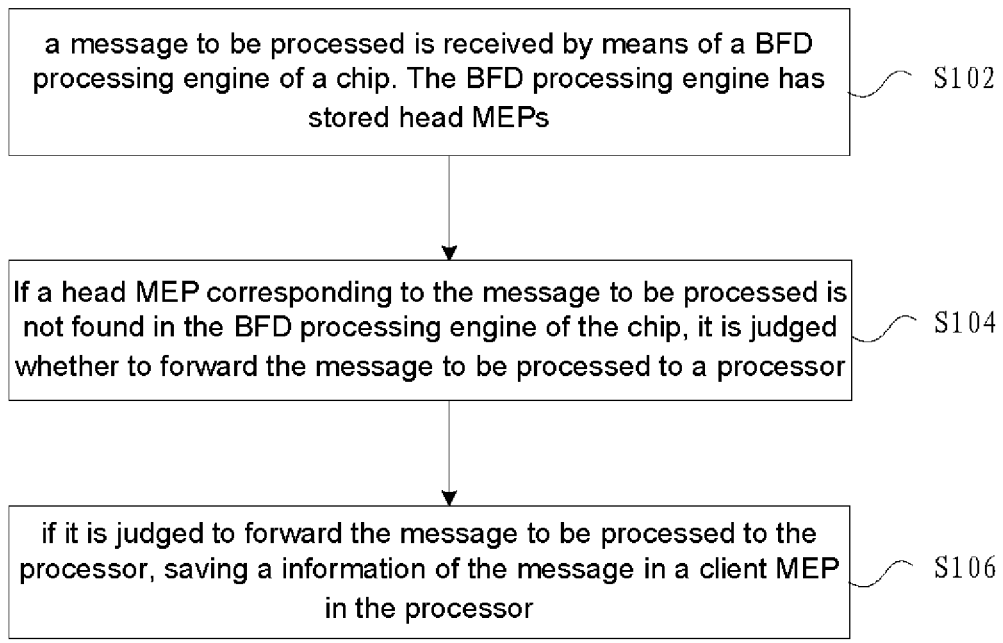
FIG. 1 is a flowchart of a message processing method according to an embodiment of the present disclosure.

The present disclosure is described below with reference to the drawings and in conjunction with the embodiments in detail. It should be noted that embodiments in the present application and features in the embodiments may be combined under the condition of no conflicts.

It should be noted that the description and claims of the present disclosure and the terms "first", "second" and the like in the drawings are used for distinguishing between similar objects and not necessarily for describing a particular sequential or chronological order.

In the present embodiment, a message processing method is provided. FIG. 1 is a flowchart of a message processing method according to an embodiment of the present disclosure. As shown in FIG. 1, the flow includes the following steps.

In step S102, a message to be processed is received by means of a BFD processing engine of a chip. The BFD processing engine has stored head MEPs.

In step S104, if a head MEP corresponding to the message to be processed is not found in the BFD processing engine of the chip, it is judged whether to forward the message to be processed to a processor.

In step S106, if it is judged to forward the message to be processed to the processor, saving a information of the message in a client MEP in the processor.

By means of steps S102 to S106, a message to be processed is received by means of a BFD processing engine of a chip. Then, if a head MEP corresponding to the message to be processed is not found in the BFD processing engine of the chip, it is judged whether to forward the message to be processed to a processor. Finally, if it is judged to forward the message to be processed to the processor, a information of the message is saved in a client MEP in the processor. Thus, the head MEP can still only transmit but not receive a message, but a client-type MEP is added in the processor, thereby solving the problem in the related art that an MEP on a Head side in RFC8562 only transmits but does not receive a BFD message, an MEP on a Tail side only receives but does not transmits a BFD message and thus the requirements cannot be satisfied, and improving the flexibility of message processing.

In an optional implementation of the present embodiment, the manner of receiving a message to be processed by means of a BFD processing engine of a chip involved in step S102 may further include the following steps.

In step S102-11, the message to be processed is received by means of an ingress processing engine of the chip.

In step S102-12, the message to be processed is parsed, and it is judged whether the message to be processed is legal according to a parsing result.

In step S102-13, if the message to be processed is legal, a head MEP corresponding to the message to be processed is searched in the BFD processing engine of the chip.

It can be seen that through steps S102-11 to S102-13, legality detection needs to be performed on the received message to be processed, and searching can only be performed on the basis of the message if the message is legal.

Further, the manner of searching for a head MEP corresponding to the message to be processed in the BFD processing engine of the chip mentioned in step S102-13 may further include the following steps.

In step S11, a key field in the message to be processed is acquired.

In step S12, a head MEP corresponding to the message to be processed is searched by means of the BFD processing engine based on the key field.

In the case where the message to be processed in steps S11 and S12 is a BFD message, the key field may be a key field in the BFD message, which may be Your Disc. A head MEP is queried based on the key field.

In another optional implementation of the present embodiment, the manner of judging whether to forward the message to be processed to a processor involved in step S104 may further include the following steps.

In step S104-11, it is judged whether the message to be processed is associated with a client MEP according to MEP type information in the information of the message, and it is judged whether specified field information in the information of the message is 1.

In step S104-12, if the message to be processed is associated with the client MEP and the specified field information in the information of the message is 1, the message to be processed is forwarded to the processor.

For steps S104-11 and S104-12, the message to be processed is, for example, a BFD message. MEP session information such as an MPE type needs to be taken out from DsBFDMEP according to an MEP Index, and then it is judged whether to associate a client MEP and whether a specified field F in the message is 1. If it is judged to forward the message to be processed to the processor, a destination is modified as a Central Processing Unit (CPU), and the message to be processed is forwarded to the CPU.

In another optional implementation of the present embodiment, the manner of saving the information of the message in a client MEP in the processor involved in step S106 may further include the following steps.

In step S106-11, it is determined whether a client MEP corresponding to the message to be processed exists in the processor according to the key field.

In step S106-12, if a client MEP corresponding to the message to be processed exists in the processor, the information of the message is saved in the client MEP in the processor.

In step S106-13, if a client MEP corresponding to the message to be processed does not exist in the processor, a new client MEP is created, and the information of the message is saved in the created new client MEP.

It can be seen from steps S106-11 to S106-13 that if a client MEP corresponding to the message to be processed does not exist in the processor, a client MEP needs to be newly created, and the final purpose is to store the information of the message in the message to be processed in the client MEP, thereby adding a client-type MEP in the processor for processing the message.

It should be noted that the chip in the present embodiment is a chip for an RFC8563 transmitter. The present application is exemplified below with reference to an optional implementation of the present embodiment, i.e. the case where the chip is a chip for an RFC8563 transmitter.

Figure 2:
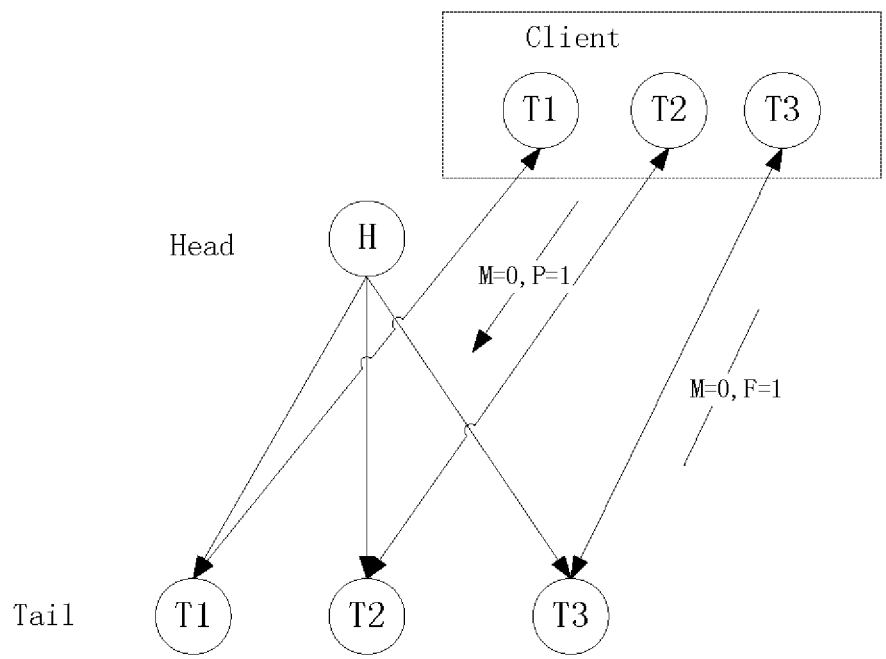
FIG. 2 is a schematic diagram of message processing in RFC8563 according to an embodiment of the present disclosure.

The present optional implementation provides a chip implementation method for Multipoint BFD. As shown in FIG. 2, in RFC8563, a Head MEP at a transmitter only transmits and but does not receive a message, while a Client MEP may transmit a query message and receive a query reply message. That is, in the present optional implementation, when implementing an RFC8563 transmitter, a Head MEP is placed in a BFD Engine for storage and state machine maintenance, and a Client MEP is placed in a CPU subsystem for storage and state machine maintenance.

Figure 3:
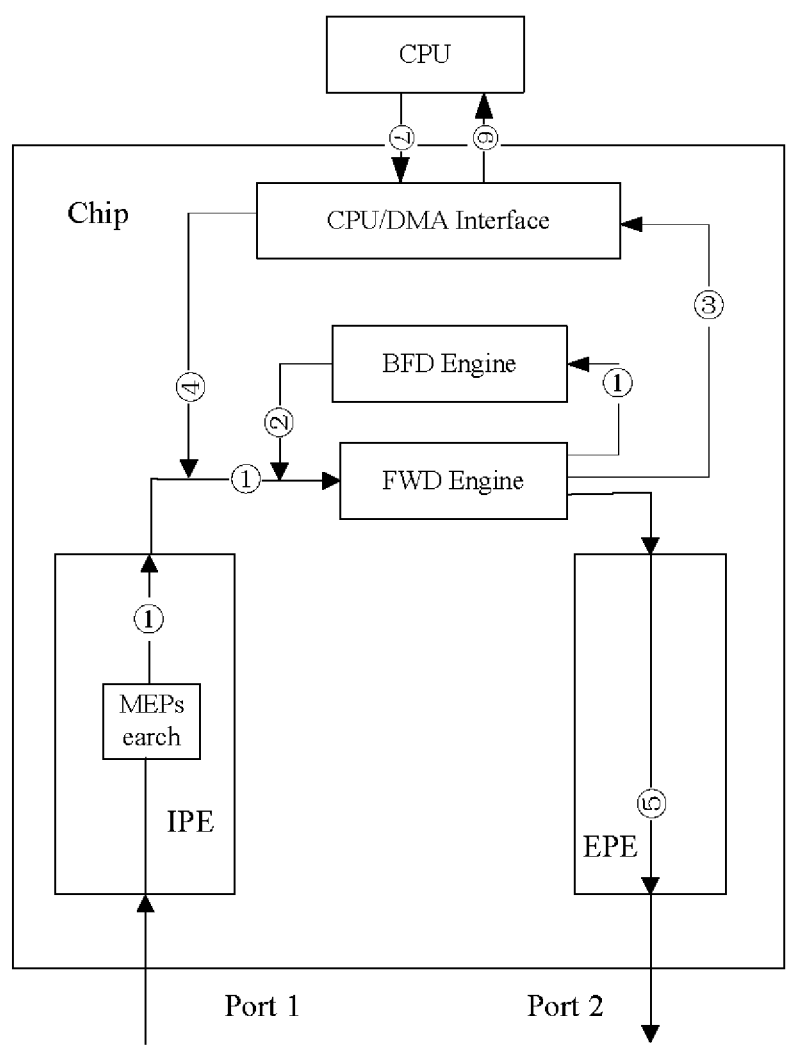
FIG. 3 is a schematic structure diagram of RFC8563 according to an embodiment of the present disclosure.

As shown in FIG. 3, since the Head MEP is stored in the BFD Engine of the chip, a BFD message is transmitted periodically in the chip according to a time interval during which the chip maintains a link, and a BFD message used for time negotiation or used for querying all Tail states at the remote end is transmitted as needed, and the message transmission passes through ② and ⑤ in FIG. 3. When the Client MEP is stored in the CPU subsystem, a BFD message will be transmitted only when a certain Tail specified by the remote end needs to be queried, and the message transmission passes through ⑦, ④ and ⑤ in FIG. 3. In other cases, a query reply message or a state message actively reported by Tail is passively received, and the message transmission passes through ①, ②, ③, and ⑥.

Figure 4:
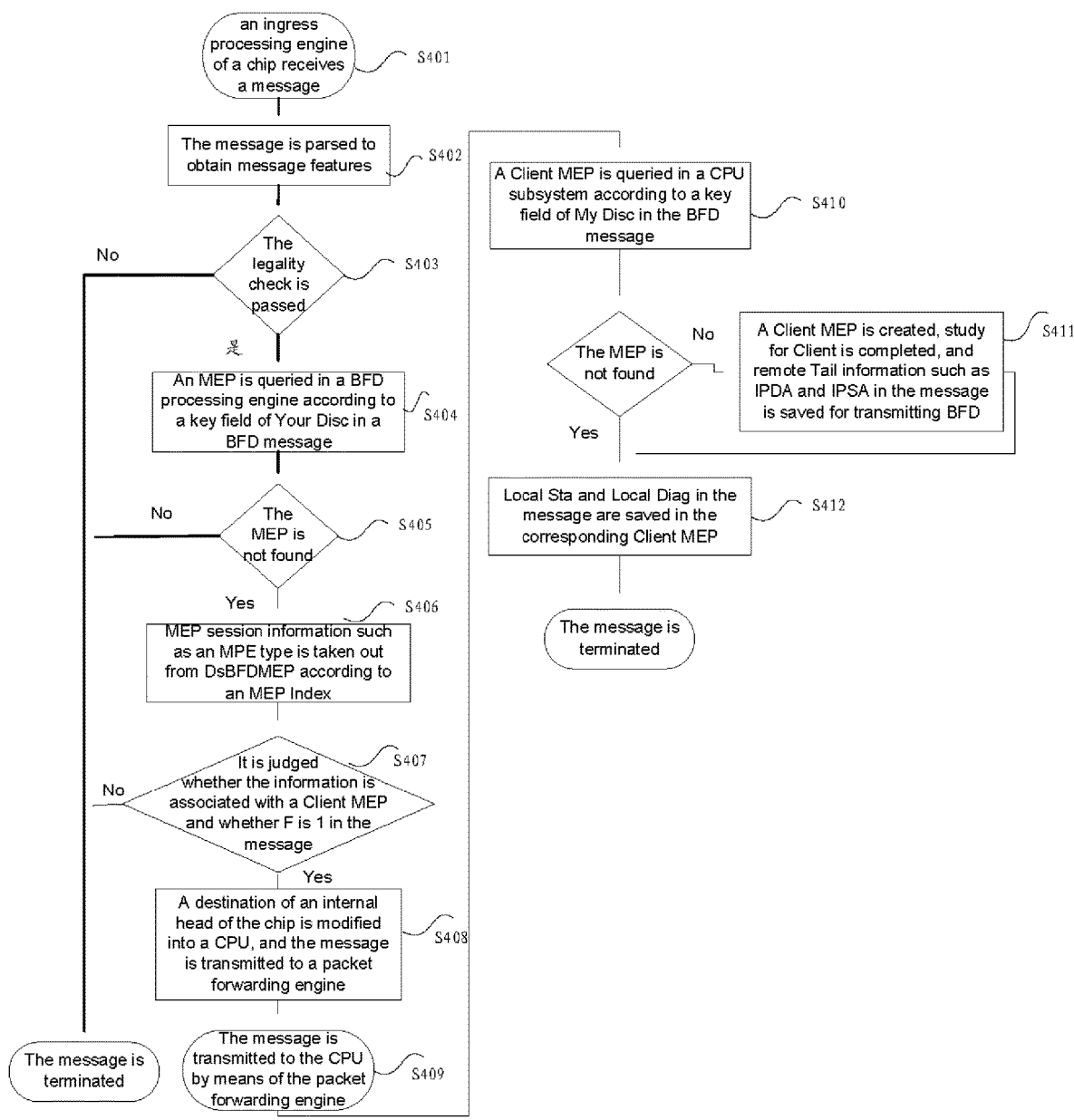
FIG. 4 is a flowchart of a chip implementation method of Multipoint BFD according to an embodiment of the present disclosure.

As shown in FIG. 4, the chip implementation method for Multipoint BFD includes the following steps.

In step S401, an ingress processing engine of a chip receives a message.

In step S402, the message is parsed to obtain message features.

In step S403, the legality of the message is detected. In the case where the message is legal, step S404 is performed, and in the case where the message is not legal, the message is terminated.

In step S404, Your Disc is used in IPE to search for a BFD MEP. If the search fails, the message is directly discarded, i.e. the message is terminated. If the search succeeds, step S405 is performed.

In step S405, an MEP Index of a Head MEP is obtained, and a BFD message is transmitted to a BFD Engine.

In step S406, after the message arrives at a BFD processing engine, and session information of the Head MEP and an MEP Type of the message are obtained according to the MEP Index.

In step S407, it may be judged whether the BFD is associated with a Client MEP according to the MEP Type, and further judged whether the message of the BFD is a state information message of the Client MEP according to whether F in the BFD message is equal to 1. If both judgment results are yes, step S407 is performed, and if one of the judgment results is no, the message is terminated.

In step S408, a destination of the BFD message in an internal head carried by the internal transmission of the chip is modified into a CPU in a BFD Engine, and then the message is transmitted to a packet forwarding engine FWD Engine.

In step S409, the message is transmitted to a CPU subsystem by means of the packet forwarding engine FWD Engine.

In step S410, a corresponding Client MEP is queried according to My Disc in the BFD message. If the search fails, step S410 is performed, and if the search succeeds, step S411 is performed.

In step S411, a Client MEP is created, and associated with a Head MEP, and then step S412 is performed.

In step S412, Local Stat and the Local Diag in the message are updated into the Client MEP.

It can be seen that in the related art, if a Client MEP is implemented in a chip, the Client MEP associated with one Head MEP will be limited by the flexibility and table entry specification of chip implementation. However, in the present embodiment, since it is fully considered that the Client MEP only transmits and receives a BFD message on demand, the Head MEP is placed in a BFD Engine for implementation, and the Client MEP is placed in a CPU subsystem for implementation, which can greatly increase the flexibility thereof and simplify the design logic of the chip.

Through the description of the above implementations, those skilled in the art can clearly understand that the method according to the above embodiment may be implemented by means of software plus a necessary general hardware platform, and of course, may also be implemented through hardware, but in many cases, the former is a better implementation. Based on such understanding, the technical solution of the present disclosure, which is essential to or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

In the present embodiment, a message processing device is also provided, which is configured to implement the above embodiments and preferred implementations, and the description thereof has been omitted. As used below, the term "module" may implement a combination of software and/or hardware of a predetermined function. Although the apparatus described in the following embodiments is preferably implemented by software, hardware or a combination of software and hardware is also possible and conceived.

Figure 5:
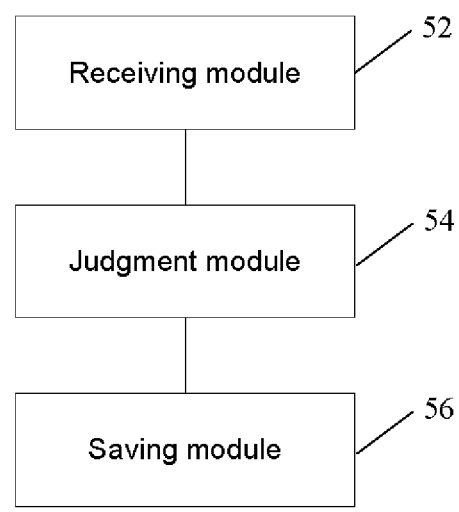
FIG. 5 is a schematic structure diagram of a message processing device according to an optional embodiment of the present disclosure.

FIG. 5 is a schematic structure diagram of a message processing device according to an embodiment of the present disclosure. As shown in FIG. 5, the device includes a receiving module 52, a judgment module 54 and a saving module 56.

(1) The receiving module 52 is configured to receive a message to be processed by means of a BFD processing engine of a chip. The BFD processing engine has stored head MEPs.

(2) The judgment module 54 is configured to judge, if a head MEP corresponding to the message to be processed is not found in the BFD processing engine of the chip, whether to forward the message to be processed to a processor.

(3) The saving module 56 is configured to save, if it is judged to forward the message to be processed to the processor, the information of the message in a client MEP is saved in the processor.

Optionally, the receiving module 52 in the present embodiment may further include: a receiving unit, configured to receive the message to be processed by means of an ingress processing engine of the chip; a processing unit, configured to parse the message to be processed, and judge whether the message to be processed is legal according to a parsing result; and a searching unit, configured to search, if the message to be processed is legal, for a head MEP corresponding to the message to be processed in the BFD processing engine of the chip.

Optionally, the searching unit in the present embodiment may further include: an acquisition subunit, configured to acquire a key field in the message to be processed; and a searching subunit, configured to search for a head MEP corresponding to the message to be processed by means of the BFD processing engine based on the key field.

Optionally, the judgment module 54 in the present embodiment may further include: a judgment unit, configured to judge whether the message to be processed is associated with a client MEP according to MEP type information in the information of the message, and judge whether specified field information in the information of the message is 1; and a forwarding unit, configured to forward, if the message to be processed is associated with the client MEP and the specified field information in the information of the message is 1, the message to be processed to the processor.

Optionally, the saving module 56 in the present embodiment may further include: a determination unit, configured to determine whether a client MEP corresponding to the message to be processed exists in the processor according to the key field; a first saving unit, configured to save, if a client MEP corresponding to the message to be processed exists in the processor, the information of the message in the client MEP in the processor; and a second saving unit, configured to create, if a client MEP corresponding to the message to be processed does not exist in the processor, a new client MEP, and save the information of the message in the created new client MEP.

It should be noted that the various modules may be implemented by software or hardware, and for the latter, it may be implemented by, but not limited to: the above-mentioned modules are all located in the same processor; alternatively, the various modules may be located in different processors in any combination.

An embodiment of the present disclosure also provides a storage medium. The storage medium stores a computer program therein which, when run, is configured to perform the steps in any one of the above method embodiments.

Optionally, in the present embodiment, the storage medium may be configured to store the computer program for performing the following steps.

At S1, a message to be processed is received by means of a BFD processing engine of a chip. The BFD processing engine stores head MEPs.

At S2, if a head MEP corresponding to the message to be processed is not found in the BFD processing engine of the chip, it is judged whether to forward the message to be processed to a processor.

At S3, if it is judged to forward the message to be processed to the processor, the information of the message is saved in a client MEP in the processor.

Optionally, in the present embodiment, the storage medium may include, but is not limited to, various media capable of storing a computer program such as a U disk, a ROM, a RAM, a mobile hard disk, a magnetic disk or an optical disc.

An embodiment of the present disclosure also provides an electronic device, which includes a memory and a processor. The memory stores a computer program. The processor is configured to run the computer program to perform the steps in any one of the above method embodiments.

Optionally, the electronic device may further include a transmission device and an input/output device, where the transmission device is connected to the processor, and the input/output device is connected to the processor.

Optionally, in the present embodiment, the processor may be configured to perform the following steps through the computer program.

At S1, a message to be processed is received by means of a BFD processing engine of a chip. The BFD processing engine stores head MEPs.

At S2, if a head MEP corresponding to the message to be processed is not found in the BFD processing engine of the chip, it is judged whether to forward the message to be processed to a processor.

At S3, if a judgment result is yes, the information of the message is saved in a client MEP in the processor.

Optionally, a specific example in the present embodiment may refer to the examples described in the above embodiments and optional implementations, and details are not described herein in the present embodiment.

It is apparent that those skilled in the art should understand that the above modules or steps of the present disclosure may be implemented by a general-purpose computing device, and they may be centralized on a single computing device or distributed on a network composed of multiple computing devices. They may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure should fall within the protection scope of the present disclosure.

What is claimed is:

1. A message processing method, comprising:
   receiving, by means of a Bidirectional Forwarding Detection (BFD) processing engine of a chip, a message to be processed, wherein the BFD processing engine has stored head Maintenance End Points (MEP);
   if a head MEP corresponding to the message to be processed is not found in the BFD processing engine of the chip, judging whether to forward the message to be processed to a processor; and
   if it is judged to forward the message to be processed to the processor, saving an information of the message in a client MEP in the processor;
   wherein receiving, by means of the BFD processing engine of the chip, the message to be processed comprises:
   receiving, by means of an ingress processing engine of the chip, the message to be processed;
   parsing the message to be processed, and judging whether the message to be processed is legal according to a parsing result; and
   if the message to be processed is legal, searching for a head MEP corresponding to the message to be processed in the BFD processing engine of the chip.

2. The method according to claim 1, wherein the searching for the head MEP corresponding to the message to be processed in the BFD processing engine of the chip comprises:
   acquiring a key field in the message to be processed; and
   searching, by means of the BFD processing engine based on the key field, for the head MEP corresponding to the message to be processed.

3. The method according to claim 2, wherein the saving the information of the message in a client MEP in the processor comprises:
   determining, according to the key field, whether a client MEP corresponding to the message to be processed exists in the processor;
   if a client MEP corresponding to the message to be processed exists in the processor, saving the information of the message in the client MEP corresponding to the message to be processed; and
   if a client MEP corresponding to the message to be processed does not exist in the processor, creating a new client MEP, and saving the information of the message in the created new client MEP.

4. A non-transitory computer-readable storage medium, wherein the non-transitory computer-readable storage medium stores a computer program, the computer program is executed to perform the method according to claim 3.

5. A non-transitory computer-readable storage medium, wherein the non-transitory computer-readable storage medium stores a computer program, the computer program is executed to perform the method according to claim 2.

6. An electronic device, comprising a memory and a processor, wherein the memory stores a computer program, and the processor is configured to run the computer program to perform the method according to claim 2.

7. The method according to claim 1, wherein the judging whether to forward the message to be processed to the processor comprises:
    judging whether the message to be processed is associated with a client MEP according to MEP type information in the information of the message, and judging whether specified field information in the information of the message is 1; and
    if the message to be processed is associated with the client MEP and the specified field information in the information of the message is 1, forwarding the message to be processed to the processor.

8. A non-transitory computer-readable storage medium, wherein the non-transitory computer-readable storage medium stores a computer program, the computer program is executed to perform the method according to claim 7.

9. The method according to claim 1, wherein the chip is a chip for an RFC8563 transmitter.

10. A non-transitory computer-readable storage medium, wherein the non-transitory computer-readable storage medium stores a computer program, the computer program is executed to perform the method according to claim 9.

11. A non-transitory computer-readable storage medium, wherein the non-transitory computer-readable storage medium stores a computer program, the computer program is executed to perform the method according to claim 1.

12. An electronic device, comprising a memory and a processor, wherein the memory stores a computer program, and the processor is configured to run the computer program to perform the method according to claim 1.

13. A message processing device, comprising: a processor and a memory connected with the processor, wherein the processor is configured to execute following program modules stored in the memory:
    a receiving module, configured to receive a message to be processed by means of a Bidirectional Forwarding Detection (BFD) processing engine of a chip, wherein the BFD processing engine has stored head Maintenance End Points (MEP);
    a judgment module, configured to judge, if a head MEP corresponding to the message to be processed is not found in the BFD processing engine of the chip, whether to forward the message to be processed to a processor; and
    a saving module, configured to save, if it is judged to forward the message to be processed to the processor, an information of the message in a client MEP in the processor;
    wherein the receiving module comprises:
    a receiving unit, configured to receive the message to be processed by means of an ingress processing engine of the chip;
    a processing unit, configured to parse the message to be processed, and judge whether the message to be processed is legal according to a parsing result; and
    a searching unit, configured to search, if the message to be processed is legal, for a head MEP corresponding to the message to be processed in the BFD processing engine of the chip.

14. The device according to claim 13, wherein the searching unit comprises:
    an acquisition subunit, configured to acquire a key field in the message to be processed; and
    a searching subunit, configured to search for the head MEP corresponding to the message to be processed by means of the BFD processing engine based on the key field.

15. The device according to claim 14, wherein the saving module comprises:
    a determination unit, configured to determine whether a client MEP corresponding to the message to be processed exists in the processor according to the key field;
    a first saving unit, configured to save, if a client MEP corresponding to the message to be processed exists in the processor, the information of the message in the client MEP in the processor; and
    a second saving unit, configured to create, if a client MEP corresponding to the message to be processed does not exist in the processor, a new client MEP, and save the information of the message in the created new client MEP.

16. The device according to claim 13, wherein the judgment module comprises:
    a judgment unit, configured to judge whether the message to be processed is associated with a client MEP according to MEP type information in the information of the message, and judge whether specified field information in the information of the message is 1; and
    a forwarding unit, configured to forward, if the message to be processed is associated with the client MEP and the specified field information in the information of the message is 1, the message to be processed to the processor.

* * * * *